(12) United States Patent
Stevenson et al.

(10) Patent No.: US 7,156,940 B1
(45) Date of Patent: Jan. 2, 2007

(54) IN-MOLD INDICIA PRINTING OF PLASTISOL PARTS

(75) Inventors: Michael J. Stevenson, 460 Little Scout, Sedona, AZ (US) 86336; Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 0 days.

(21) Appl. No.: 11/404,316

(22) Filed: Apr. 14, 2006

(51) Int. Cl.
*B29C 47/00* (2006.01)
*B29C 47/02* (2006.01)
*B29C 47/06* (2006.01)
*B28B 1/00* (2006.01)
*B29C 33/34* (2006.01)
*B28B 1/20* (2006.01)
*B28B 1/24* (2006.01)

(52) U.S. Cl. .................. 156/245; 156/125; 156/245; 156/500; 101/129; 101/114; 264/310; 264/316

(58) Field of Classification Search .......... 156/125, 156/242, 245, 500; 101/114, 129; 264/310, 264/316; 428/40.1–42.2, 542.2, 914
See application file for complete search history.

(56) References Cited

U.S. PATENT DOCUMENTS

| | | | |
|---|---|---|---|
| 2,629,134 A | 2/1953 | Molitor | |
| 2,874,964 A | 2/1959 | Edwards | |
| 3,079,644 A | 3/1963 | Molitor | |
| 6,682,679 B1 * | 1/2004 | Marentic et al. | 264/247 |

* cited by examiner

*Primary Examiner*—Melvin Mayes
*Assistant Examiner*—Sonya Mazumdar
(74) *Attorney, Agent, or Firm*—Robert E. Strauss

(57) ABSTRACT

This invention is a method for the precise placement of indicia with high resolution into the wall of a hollow-form, molded plastisol part. The method includes the steps of preparing a plastisol graphic transfer by casting a base layer of plastisol onto a carrier sheet, printing indicia with pigmented plastisols onto the base layer of plastisol to form a graphic transfer, and over printing the graphic transfer with a body layer of plastisol. After each layer of plastisol is deposit, the layer cured by heating before depositing the next layer and the transfer is heated to cure the final, body layer. The transfer is applied to a selected inside surface of a conventional rotational mold by applying a high-solvent-content adhesive to the mold surface, stripping the plastisol transfer from the carrier sheet and applying it against the adhesive coated mold surface, and pressing the transfer against the adhesive-coated surface of the mold, permitting the applied transfer to dry over a short interval and then continuing with an otherwise conventional rotomolding or slush molding process to obtain a molded hollow form part having the indicia permanently fused into the wall of the part.

8 Claims, 1 Drawing Sheet

IN-MOLD INDICIA PRINTING OF PLASTISOL PARTS

BACKGROUND OF THE INVENTION

1. Field of Invention

This invention relates to molding of plastisol products and, in particular, to a method for in-mold indicia marking of plastisol products.

2. Brief Statement of the Prior Art

Plastisols are fluid dispersion of polyvinyl chloride resins and are used in many applications such as footwear, upholstery fabrics, shower curtains, cushions, gloves, etc. A particular application of interest is the rotationally molding of plastisols to manufacture buoys, cushioning barriers and bumpers for water craft.

Unfortunately, the surfaces of plastisol products do not readily accept conventional adhesive labels, paint or printing inks, and attempts to label, print or decorate the surfaces have not resulted in permanent bonding of labels or other indicia to the surfaces, and have lacked the capability of precise placement and resolution of indicia images.

U.S. Pat. No. 3,079,644 discloses a method for the in-mold decoration of hollow-form plastisol products. In this method, a conventional rotomolding or slush molding process is modified by introducing colored plastisol design pieces into the mold, heating the mold to a first temperature to gel the design pieces and thereafter introducing the background plastisol into the mold and heating the mold to a higher temperature to form a hollow form product in which the design pieces are incorporated in the product wall. In one embodiment of this method, design pieces are cut from a preformed and gelled, varicolored, plastisol sheet and are laid against the interior surface of the rotational mold, the background plastisol is added to the mold, and the mold is closed and heated while being rotated about two axis until a product with the desired wall thickness is formed. The patent discloses that adhesion of the gelled design pieces to the interior surface of the rotational mold can be improved by heating the mold before application of the design pieces.

While the method of this patent is useful for the decoration of large objects, it lacks the precision necessary for satisfactory application of labels and printed matter and resolution of the indicia image.

OBJECTIVES OF THIS INVENTION

It is an object of this invention to provide a method for the permanent application of indicia to a plastisol product.

It is also an object of this invention to provide a method that permits precise application of high resolution indicia images to a plastisol product.

It is a further object of this invention to provide a method for the in-mold application of indicia into the wall of a rotationally molded, plastisol product.

It is likewise an object of this invention to provide an in-mold application of indicia having an ease of application with a high degree of precision and image resolution.

Other and related objectives will be apparent from the following description of the invention.

BRIEF DESCRIPTION OF THE INVENTION

This invention comprises the steps of preparing a plastisol graphic transfer by casting a base layer of plastisol onto a carrier sheet, curing the base layer, followed by printing indicia with pigmented plastisols onto the base layer of plastisol to form a graphic transfer, curing the printed graphic transfer after each printing step, and over printing the graphic transfer with a top layer of plastisol, and then curing the final transfer. The transfer is applied to a selected inside surface of a conventional rotational mold by applying a high solvent content adhesive to the mold surface, stripping the plastisol transfer from the carrier sheet and applying it against the adhesive-coated mold surface, and pressing the cover sheet tightly against the transfer, permitting the applied transfer to dry over a short interval and then continuing with an otherwise conventional rotomolding or slush molding process. In the preferred method, a release agent is incorporated in the base layer of plastisol to facilitate the application of the printed transfer to the interior surface of the rotational mold.

DETAILED DESCRIPTION OF THE INVENTION

The invention is a method for the in-mold application of indicia to plastisol products, preferably hollow-form plastisol products formed by rotational molding. In the conventional rotational molding, hollow-form plastic parts are formed by charging a plastisol to a rotational mold comprising at least two mold parts having sealing faces which mate together on a parting line to form an internal mold cavity, closing and heating the mold to the curing temperature of the plastisol while rotating the mold about its major and minor axes for a time sufficient to form the molded part, cooling the mold to a demolding temperature, opening the mold and ejecting the molded part.

This invention utilizes a plastisol graphic transfer which is placed in the rotational mold and which fuses into the outside surface of the molded part. The transfer used in the invention will be described with reference to FIGS. 1 and 2. The transfer is prepared by printing multiple layers onto a carrier sheet using screen printing.

Figure 1:
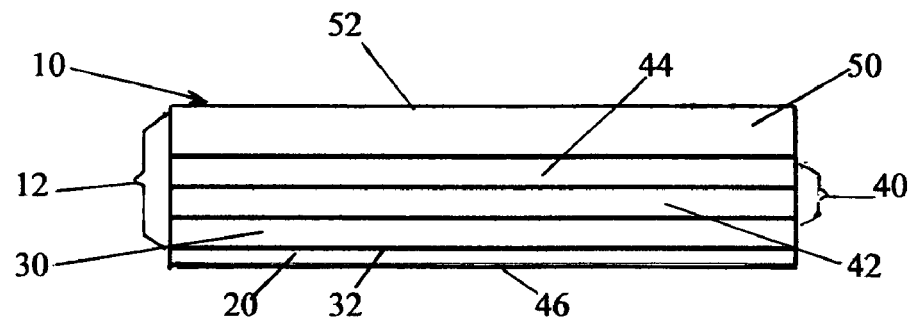
FIG. 1 is a highly enlarged side view of the transfer used in the invention.

FIG. 1 is a side view of the transfer 10 in which the vertical axis is greatly enlarged for clarity. The transfer consists of a carrier sheet or film 20, preferably of clear plastic film such as polyester film with a thickness of from 0.5 to about 2 mils. Alternatively, but not as preferred are other sheets such as parchment paper, or polyolefin films.

A base layer 30 of clear or transparent plastisol is printed onto the carrier film by screen printing using screen of relatively fine mesh, e.g., from about 100 to 350 mesh, preferably from 200 to 325 mesh, to obtain a smooth surfaced layer. The thickness of this layer can be varied from about 1 to 5 mils, preferably about 1 to 2 mils. The plastisol can be a commercially available mixture of polyvinyl chloride and plasticizer which is compounded into a fluid paste and can contain minor amounts of ingredients such as heat stabilizers and pigments or other color additives. Polyvinyl chloride plastisols having durometer values from 30 to about 90 Shore A are useful in the invention. Typically the gelling temperature of useful plastisols range from 180° to 275° F. and the fusing or curing temperature ranges from about 180° F. to 375° F. Useful plasticizers are alkyl phosphates, e.g., tricresyl phosphate; dialkyl esters of aliphatic dicarboxylic acids, e.g., dioctyl adipate which are used at the suppliers' recommended concentrations.

The indicia layer 40 can be a single layer of a colorant in a suitable carrier such as a hydrocarbon wax, or can be multiple layers such as 42 and 44, with each layer providing a single color. Preferably these layers are printed over the plastisol base layer 30 by screen printing with screens having mesh sizes from 350 to about 100 mesh, depending on the resolution, or fineness of detail desired in the indicia layer. As conventional in screen printing, the screen is preferably a photographic screen by exposing a photographic emulsion coated screen to light passing through a transparent overlay printed with an image of the desired indicia array, thereby depositing a non-permeable material to form a stencil. The fineness or resolution of the printing achieved with the screen directly depends on the mesh of the screen with screens of higher mesh size yielding higher resolution of the printed indicia array.

Figure 2:
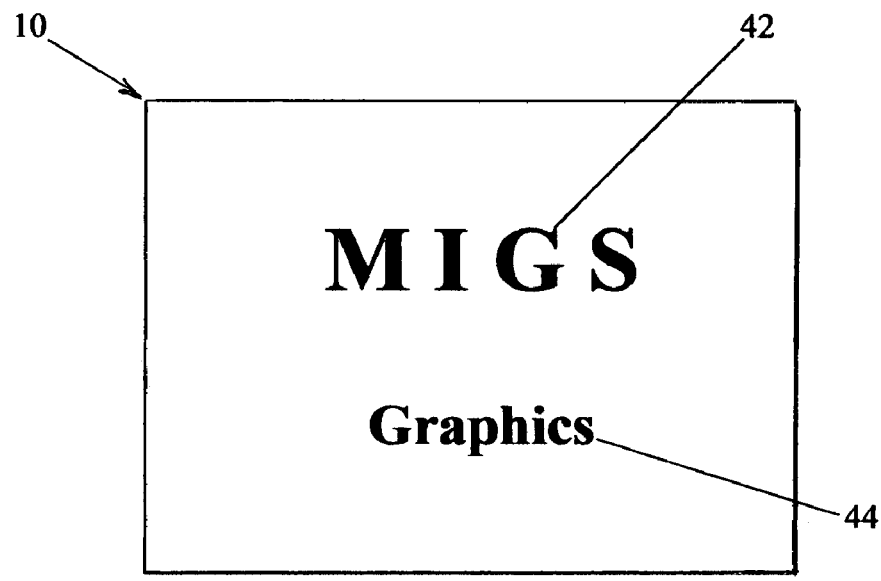
FIG. 2 is a top view of the transfer used in the invention.

The indicia layer thus comprises an indicia material in a printed pattern such as a graphic or alpha-numerical array which is desired to be imparted to the part during molding. A label printed with alpha-numerical indicia and/or graphic art is an excellent example of an indicia array. FIG. 2 is a view of the bottom surface 46 of the transfer 10, observing the indicia image through the clear carrier sheet 20 as it will appear on the molded product.

The indicia material is admixed with plastisol to form a printing mixture which is suitable for hot screen printing. Preferably the mixture contains these components in proportions suitable for screen printing such as from 85 to 40 weight percent plastisol and from 15 to 60 weight percent indicia material Preferably the mixture contains from 60 to 80 weight percent plastisol and from 40 to 20 weight percent indicia material. If desired, viscosity additives such as fumed silica or silicates can be added in minor amounts to provide an optimum viscosity (100 to 1000 centipoise) for screen printing.

Various additives can be incorporated in the plastisol in minor quantities to improve the properties of the plastisol such as ultraviolet light protectants such as hindered amines, and tackifiers such as polyterpene resins, resins and aliphatic and aromatic hydrocarbons. The light protectors can be used in concentrations from 0.5 to about 1.5 weight percent, and tackifiers can be used in amounts from about 5 to 35 weight percent of the mixture.

Useful indicia material can be colorants such as pigments and dyes as well as metal particles in flake or ball shape. Useful colorants include those containing inorganic pigments such as titanium dioxides (rutile analase), zinc oxide, iron oxides in hues such as yellow, buff, tan, brown salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum zinc copper borate powders, metal silver pigments, pearlescent and iridescent flakes of basic lead carbonates, bismuth oxychiorides and tftanium coated mica, etc. Various organic pigments which are useful include azo pigments such as benzimidazolone pigments, pyrazolorie pigments, copper phthalocyanine quinacrjdones, anthraquinones, condensations pigments, tetrachloro-isoindolinones, carbon blacks, etc.

The screens used for the hot screen printing are metallic screens having mesh sizes from 100 to 350 mesh, with the finer screens (higher mesh values) being used for high resolution printing which can closely simulate high photographic quality. Preferably, screens having mesh sizes from 225 to 325 are used for printing the base layer and the indicia layer, thus providing a very smooth surfaces to the base and indicia layers and a high image resolution to the indicia layers.

A support layer 50 is printed over the indicia layers. Preferably this layer has a thickness from 3 to about 7 mils, most preferably from 3 to 4 mils to provide a body which will support the transfer during application, when it has been stripped from the carrier sheet 20. Also, it is preferred to include a release agent, such as a silicon or soap, e.g., aluminum stearate. The release agent is used at concentrations from 0.3 to about 1.3 weight percent, sufficient to provide a non-tacky surface 48 to the top layer 50. This layer is printed with a plastisol, preferably using screens having mesh sizes from 100 to about 200 to impart a relatively rough outer surface 52 to the top layer 50.

The plastisol layers are gelled after each printing step by heating the printed transfer to the requisite gelation temperature for the plastisol. Typically, the transfer is heated to a temperature from 180° F. to 275° F. for a period sufficient to gel the plastisol in accordance with the plastisol supplier's specifications.

The transfer 10 is used in a roto-molding process by application of the transfer packet 12 to a selected area of the interior surface of a rotational mold. Prior to application of the transfer packet, the selected area of the mold surface is coated with an adhesive. Preferably, an adhesive composition having a high content of volatile solvent is sprayed, brushed or otherwise applied to the mold surface. A suitable adhesive comprises from 5 to 35 weight percent of a tackifier such as rosin, aromatic and aliphatic hydrocarbon resins and terpene based resins in a volatile organic solvent. The solvent comprises from 65 to 95 weight percent of the adhesive composition and can be any volatile hydrocarbon solvent such as hexane or aliphatic hydrocarbon solvents, mineral spirits, Stoddard solvent, etc.

The transfer packet 12 is stripped from the carrier sheet 20, exposing a smooth surface 32 (see FIG. 1), which is applied against the adhesive-coated, selected surface area of the rotational mold. The transfer packet 12 is pressed against the mold surface, using a roller or squeegee. In some applications, a protective sheet such as the carrier sheet 20 can be applied over the outer surface 52 of the transfer packet and pressure is applied to the carrier sheet to press the transfer packet 12 tightly against the surface of the mold. The pressure is applied to the transfer packet 12 to ensure that no air bubbles are included between the transfer packet and the mold surface. In most production applications, the mold surface may be at an elevated temperature, e.g., at the demolding or ejection temperature to which the mold has been cooled during the previous molding cycle. This temperature can be from 60° F. to 130° F.

After the transfer packet has been applied to the mold surface, the adhesive dries within approximately 30 seconds after application. The background plastisol, which can be a liquid or particulate solid, is then charged to the mold in an amount calculated to provide a molded product with the desired wall thickness, all in accordance with a conventional rotational molding process. The mold is then closed and heated to the fusion temperature of the background plastisol, typically from about 300° F. to about 350° F. and the mold is heated while rotated about its major and minor axes for a sufficient time at the fusion temperature to cure the plastisol, typically from 1 to about 10 minutes. The mold is then cooled to the demolding temperature, the mold is opened and a molded plastisol product is ejected. The product has the indicia array of the transfer packet permanently molded into the selected area of its outer wall surface.

The method of the invention is illustrated by the following examples which also serve to demonstrate the results obtainable with the invention.

EXAMPLE 1

A hollow form polyvinyl chloride buoy approximately 16 inches long, 5 inches wide and 3.5 inches thick is prepared using the invention to permanently mold a manufacturer's logo having a 4 inch by 1.5 inch oval shape into a central area of the outer surface of the bumper.

A transfer is prepared by printing a clear plastisol base layer approximately 2 mils thick onto a clear polyester film coated with a silicone release agent. The plastisol is a polyvinyl chloride liquid having a durometer value of 70 Shore A. The base layer is gelled by heating to a temperature of 250° F. and then cooled and a first indicia layer is printed over the gelled base layer, using a liquid plastisol with approximately 30 weight percent of a thiocyanate blue colorant using a 275 mesh screen to deposit a layer with a thickness of 1 mil. The first indicia layer is gelled by heating the carrier sheet and layers to a temperature of 250° F. The transfer is cooled and printed with a second indicia layer using a liquid plastisol containing 30 weight percent of a white (titanium dioxide) colorant, using a 275 mesh screen to deposit a second indicia layer with a thickness of 1 mil. The transfer is then heated to a temperature of 250° F. for sufficient time to cure the second indicia layer. After cooling, the transfer is printed with a clear, liquid plastisol containing 15 weight percent of aluminum stearate, using a 120 mesh screen to deposit a top layer having a thickness of 4 mils. The transfer is then heated to 250° F. to cure the top plastisol layer.

An adhesive spray containing 30 weight percent of a hydrocarbon resin adhesive dissolved in Stoddard solvent is applied to a selected area of a rotational mold for the boat bumper, the transfer is stripped from the carrier sheet transfer, exposing the printed surface of the first, clear layer of the transfer. This surface is placed on the adhesive-coated area of the mold and the transfer is pressed against the mold with a soft silicon rubber roller to adhere the transfer and expel air bubbles.

A sufficient quantity of plastisol to form the buoy is poured into the mold cavity. This plastisol contains 30 weight percent titanium dioxide and has a Shore A durometer value of 55. The mold is closed and processed in the conventional molding cycle by heating to 450° F. and maintained at that temperature for 8 minutes while rotating the mold about its major and minor axes. The mold is cooled for approximately 16 minutes, and a buoy with a wall thickness of 0.125 inch is ejected. The bumper has the manufacturer's logo permanently embedded in its outer wall.

EXAMPLE 2

An automotive console cover is permanently imprinted with the automotive manufacturer's logo using the invention. A transfer is prepared using the procedure described in Example 1, except a single indicia layer is used in which the logo is printed with a single, blue color. The transfer is applied using the spray adhesive and procedure described in Example 1 to a selected area of the mold to be incorporated in the top wall of the cover. The cover is approximately 10×4.5×4 inches and is formed by rotational molding of a liquid plastisol. The transfer is permanently molded into the top wall of the cover, entirely flush with the wall surface.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. The method for in-mold application of indicia of graphic and alpha-numerical indicia during rotational molding of a hollow-form, plastisol part, wherein a plastisol indicia piece is applied to the interior surface of a rotational mold, and background plastisol is charge to the mold, the mold is closed and heated to an elevated, plastisol curing temperature while being rotated about its axes, cooled and a molded hollow-form object is ejected, the improvement comprising:

a preparing a plastisol indicia transfer by the steps of:

i. printing a plastisol onto a carrier sheet with a printing screen having a mesh between 100 and 350 mesh to deposit a plastisol base layer, curing the deposited plastisol by heating the base layer to a plastisol curing temperature;

ii. printing a plastisol mixture containing indicia material over the base layer with a screen having a mesh from 100 to 350 mesh to deposit at least one plastisol indicia layer and curing the deposited indicia layer by heating the layer to a plastisol curing temperature; and iii. printing a plastisol mixture over the indicia layer with a screen having a mesh size from 100 to 200 mesh to deposit a support layer of plastisol, and curing the support layer by heating to a plastisol curing temperature;

b. applying an adhesive composition to a selected area of the interior surface of the rotational mold, said adhesive composition comprising from 5 to 25 weight percent of a tackifier and 95 to 75 weight percent of a volatile hydrocarbon solvent to obtain an adhesive-coated, selected area; and c. stripping the carrier sheet from the indicia transfer and applying the transfer to the adhesive-coated, selected area with the base layer of the transfer against the adhesive coated, selected area and and pressing the transfer against the adhesive coated selected area of the mold to secure the transfer to the selected area.

2. The method of claim 1, wherein the indicia comprises indicia material of multiple colors and each of the multiple colors is printed as a separate layer in step a(ii) using a screen having a stencil area specific for each color.

3. The method of claim 1 wherein said indicia mixture comprises an indicia material in a plastisol at concentrations of 1 to 70 weight percent indicia material.

4. The method of claim 1 wherein said indicia mixture comprises an indicia material in a plastisol at concentrations of 15 to 40 weight percent indicia material.

5. The method of claim 1 wherein the tackifier is selected from the group consisting of rosin, aromatic and aliphatic hydrocarbon resins and waxes, synthetic hydrocarbon waxes, oxidized synthetic waxes, terpene based resins and mixtures thereof.

6. The method of claim 1 wherein said hydrocarbon solvent is selected from the group consisting of hexane or aliphatic hydrocarbon solvents, mineral spirits and mixtures thereof.

7. The method of claim 1 including the step of incorporating a release agent in the plastisol mixture used in step a(iii) to form said support layer.

8. The method of claim 7 wherein said release agent is aluminum stearate.

* * * * *

UNITED STATES PATENT AND TRADEMARK OFFICE
CERTIFICATE OF CORRECTION

| | | |
|---|---|---|
| PATENT NO. | : 7,156,940 B1 | Page 1 of 1 |
| APPLICATION NO. | : 11/404316 | |
| DATED | : January 2, 2007 | |
| INVENTOR(S) | : Michael J. Stevenson and Robert A. Reeves | |

It is certified that error appears in the above-identified patent and that said Letters Patent is hereby corrected as shown below:

Column 6, line 21, "charge" should be: --charged--

Signed and Sealed this

Tenth Day of April, 2007

JON W. DUDAS
*Director of the United States Patent and Trademark Office*